US012172441B2

(12) United States Patent
Takei et al.

(10) Patent No.: US 12,172,441 B2
(45) Date of Patent: Dec. 24, 2024

(54) LIQUID DISCHARGE HEAD

(71) Applicant: CANON KABUSHIKI KAISHA, Tokyo (JP)

(72) Inventors: Yasunori Takei, Tokyo (JP); Yoshinori Tagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 17/892,616

(22) Filed: Aug. 22, 2022

(65) Prior Publication Data

US 2022/0388307 A1 Dec. 8, 2022

Related U.S. Application Data

(63) Continuation of application No. PCT/JP2021/004508, filed on Feb. 8, 2021.

(30) Foreign Application Priority Data

Feb. 28, 2020 (JP) ................................ 2020-033348

(51) Int. Cl.
*B41J 2/14* (2006.01)

(52) U.S. Cl.
CPC .. *B41J 2/14201* (2013.01); *B41J 2002/14475* (2013.01)

(58) Field of Classification Search
CPC .......... B41J 2/14201; B41J 2002/14475; B41J 2002/14169; B41J 2/1404
See application file for complete search history.

(56) References Cited

U.S. PATENT DOCUMENTS

| | | | |
|---|---|---|---|
| 2004/0008239 | A1 | 1/2004 | Kubota |
| 2007/0146437 | A1 | 6/2007 | Murakami |
| 2014/0368580 | A1 | 12/2014 | Ishimatsu |
| 2015/0251420 | A1 | 9/2015 | Mallinson |

FOREIGN PATENT DOCUMENTS

| | | | | |
|---|---|---|---|---|
| CN | 109689373 | A | | 4/2019 |
| EP | 2390094 | B1 | | 9/2015 |
| JP | 08-001930 | A | | 1/1996 |
| JP | 2004213033 | A | | 7/2004 |
| JP | 2008200950 | A | * | 9/2008 |
| JP | 2009126062 | A | | 6/2009 |
| JP | 2018-202806 | A | | 12/2018 |

* cited by examiner

*Primary Examiner* — Justin Seo
*Assistant Examiner* — Tracey M McMillion
(74) *Attorney, Agent, or Firm* — Canon U.S.A., Inc. IP Division

(57) ABSTRACT

According to an aspect of the present invention, a liquid discharge head includes a discharge outlet configured to discharge a liquid, wherein a division member dividing the discharge outlet into a plurality of regions is formed in the discharge outlet when viewed from a position facing the discharge outlet, wherein, when a direction in which the liquid is discharged from the discharge outlet is a direction upward from bottom, the division member has a first surface and a second surface facing upward, and wherein the second surface is disposed at the bottom lower than the first surface.

20 Claims, 10 Drawing Sheets

SECTION B – B'

SECTION B – B'

SECTION B – B'

LIQUID DISCHARGE HEAD

CROSS-REFERENCE TO RELATED APPLICATIONS

This application is a Continuation of International Patent Application No. PCT/JP2021/004508, filed Feb. 8, 2021, which claims the benefit of Japanese Patent Application No. 2020-033348, filed Feb. 28, 2020, both of which are hereby incorporated by reference herein in their entirety.

BACKGROUND OF THE INVENTION

Field of the Invention

The present disclosure relates to a liquid discharge head.

Background Art

A liquid discharge head mounted on a liquid discharge apparatus that performs recording by discharging a liquid to a recording medium applies energy, such as heat, to the liquid, and discharges the liquid from a discharge outlet. The liquid discharged from the discharge outlet is mainly configured of a main drop (generated from a tip of a droplet) and a plurality of sub-drops (generated from a discharge liquid column portion). It is known that the column portion (hereinafter referred to as a tail) is formed in a process in which the liquid is discharged from the discharge outlet, and separated into a plurality of minute sub-drops (hereinafter referred to as satellites) while flying before landing on the recording medium. As compared with the main drop, the satellites caused by the separation of the tail are small in volume and the discharge speed is slow, and thus the satellites can land at positions deviated from the main drop landed on the recording medium. Therefore, if the satellites are generated, recording quality can be deteriorated.

Japanese Patent Application Laid-Open No. 2011-207235 discusses a liquid discharge head that can suppress generation of satellites by a protruding portion formed at the opening of the discharge outlet in such a manner that the protruding portion protrudes toward the inside of a discharge outlet. In Japanese Patent Application Laid-Open No. 2011-207235, the generation of the satellites is suppressed by shortening a tail that becomes the source of the satellites.

CITATION LIST

Patent Literature

PTL 1: Japanese Patent Application Laid-Open No. 2011-207235

The method discussed in Japanese Patent Application Laid-Open No. 2011-207235 can reduce satellites. However, depending on the type of a liquid to be discharged, a condition for discharge, the structure of a liquid discharge head, and the like, it is required that the satellites are less easily generated.

Therefore, the present disclosure is directed to providing a liquid discharge head that can suppress generation of satellites more sufficiently.

SUMMARY OF THE INVENTION

According to an aspect of the present invention, a liquid discharge head includes a discharge outlet configured to discharge a liquid, wherein a division member dividing the discharge outlet into a plurality of regions is formed in the discharge outlet when viewed from a position facing the discharge outlet, wherein, when a direction in which the liquid is discharged from the discharge outlet is a direction upward from bottom, the division member has a first surface and a second surface facing upward, and wherein the second surface is disposed at the bottom lower than the first surface.

According to the present disclosure, a liquid discharge head that can suppress generation of satellites more successfully can be provided.

Further features of the present invention will become apparent from the following description of exemplary embodiments with reference to the attached drawings.

DESCRIPTION OF THE EMBODIMENTS

An exemplary embodiment of the present disclosure will be described in detail below with reference to the drawings.

(Recording Element Substrate)

Figure 1:
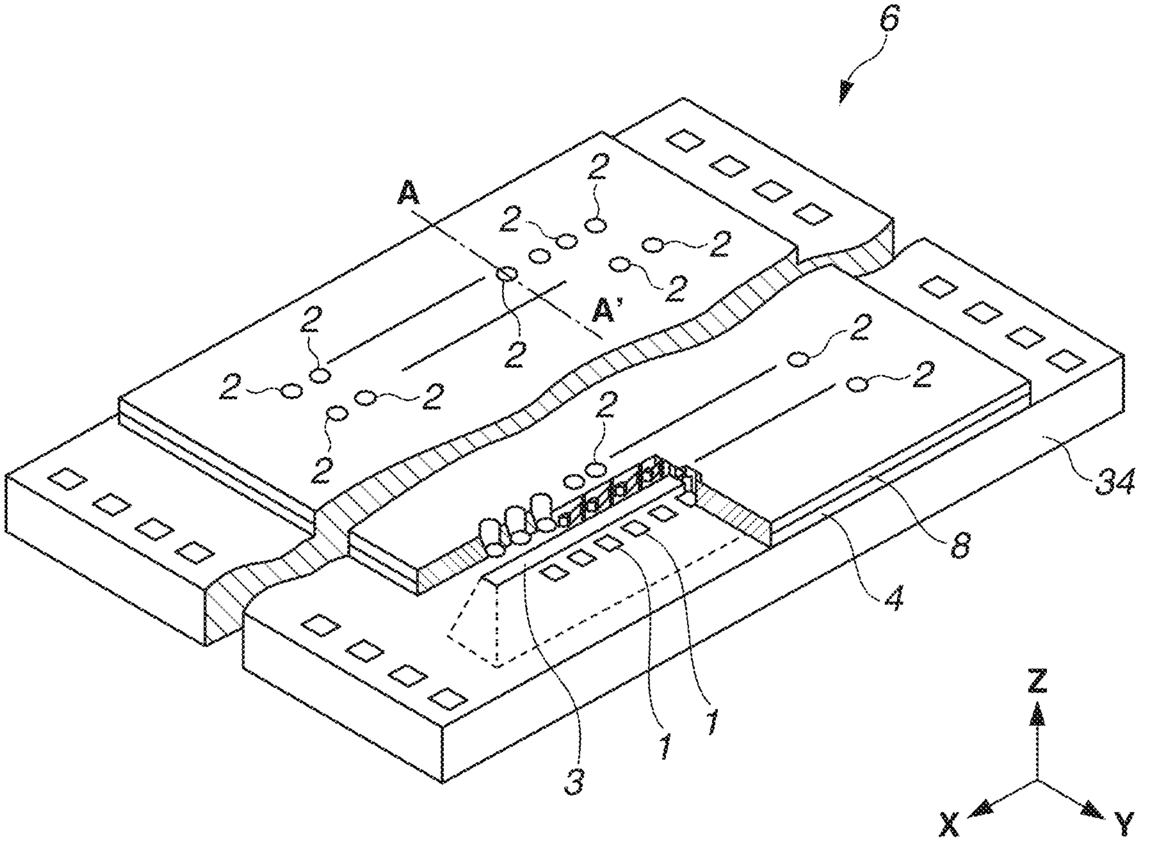
FIG. 1 is a perspective view of a recording element substrate.
Figure 2:
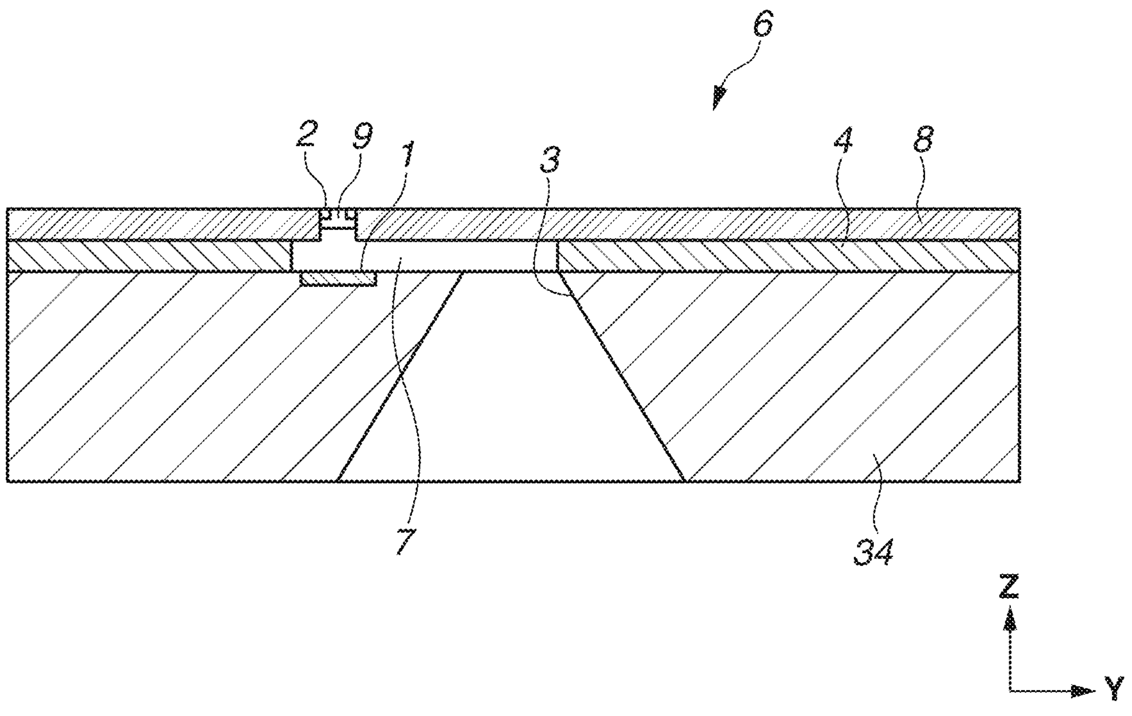
FIG. 2 is a cross-sectional view of the recording element substrate.
Figure 10:
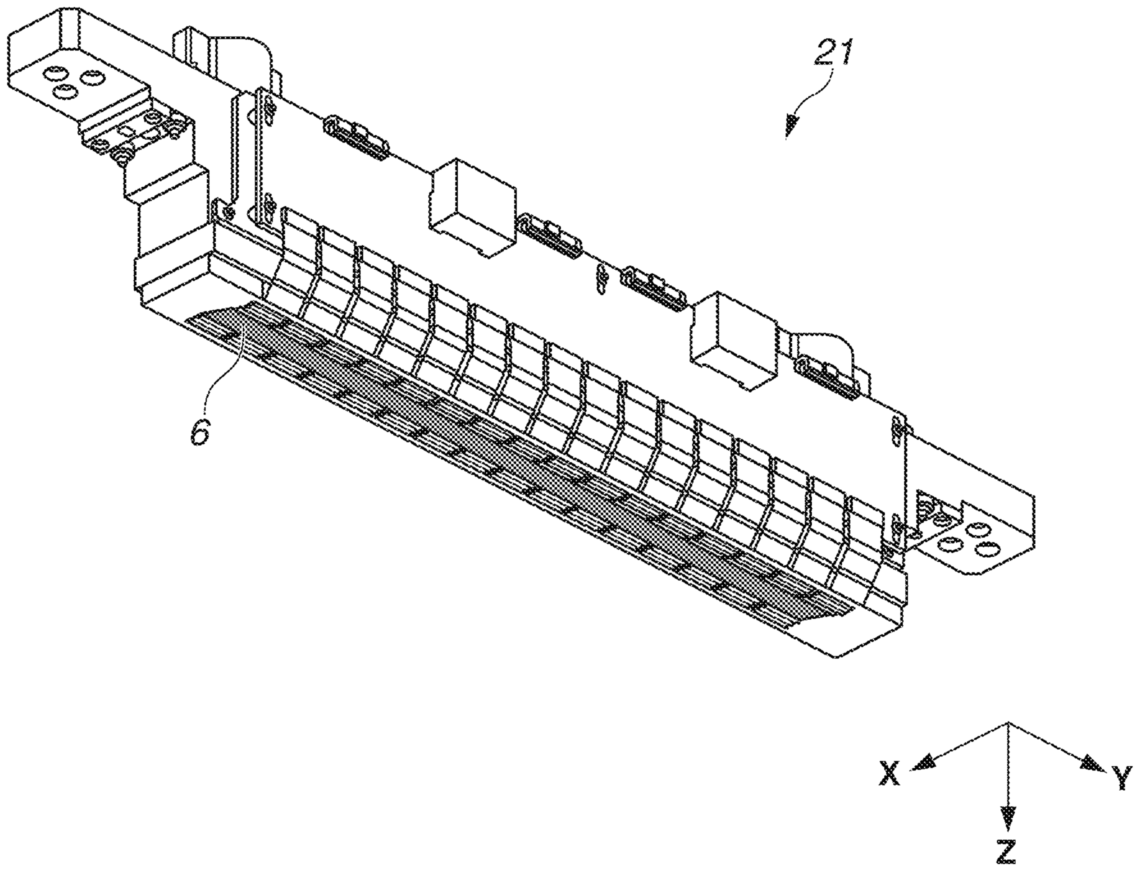
FIG. 10 is a diagram illustrating a liquid discharge head of the first exemplary embodiment.

FIG. 1 is a perspective view of a recording element substrate 6 of the present exemplary embodiment. FIG. 2 is a cross-sectional view of the recording element substrate 6 at a section A-A' illustrated in FIG. 1. FIG. 10 is a perspective view of a liquid discharge head 21 of the present exemplary embodiment. In the liquid discharge head 21, a plurality of the recording element substrates 6 is disposed in a plurality of arrays in a Y direction, so that the liquid discharge head 21 can perform high-speed recording. The recording element substrate 6 for performing recording by discharging a liquid mainly includes a substrate 34, a flow path member 4, and a discharge outlet member 8. The flow path member 4 and the discharge outlet member 8 are disposed on the substrate 34. The liquid is supplied from a liquid supply port 3 formed in the substrate 34 to a liquid flow path 7 of the flow path member 4, and then supplied to a discharge outlet 2. The liquid supplied to the discharge outlet 2 is given energy from an energy generation element 1 formed on the substrate 34, and discharged from the discharge outlet 2. In the present exemplary embodiment, an electric thermal conversion element (a heater) is presented as the energy generation element 1, but a piezo electric element may be used as the energy generation element 1.

(Discharge Outlet)

Figure 3A:
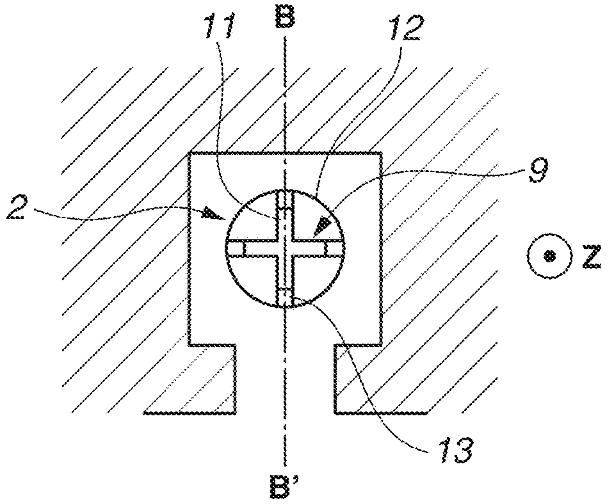
FIG. 3A is a diagram illustrating a discharge outlet of a first exemplary embodiment.
Figure 3B:
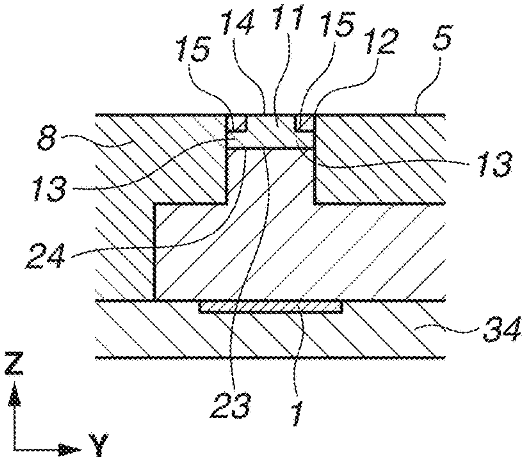
FIG. 3B is a diagram illustrating the discharge outlet of the first exemplary embodiment.
Figure 3C:
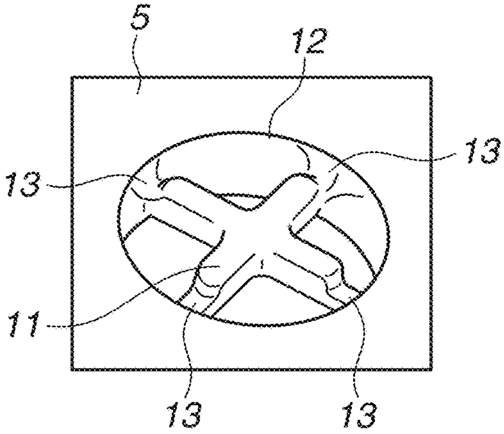
FIG. 3C is a diagram illustrating the discharge outlet of the first exemplary embodiment.
Figure 3D:
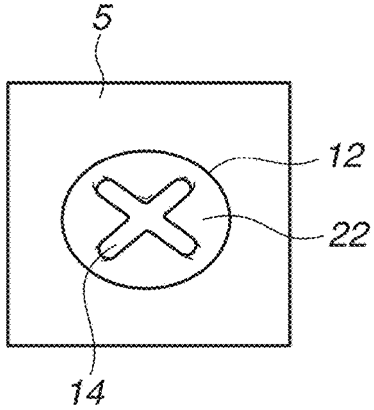
FIG. 3D is a diagram illustrating the discharge outlet of the first exemplary embodiment.
Figure 3E:
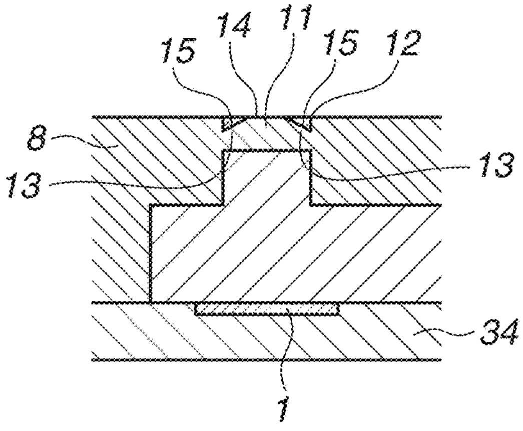
FIG. 3E is a diagram illustrating the discharge outlet of the first exemplary embodiment.
Figure 3F:
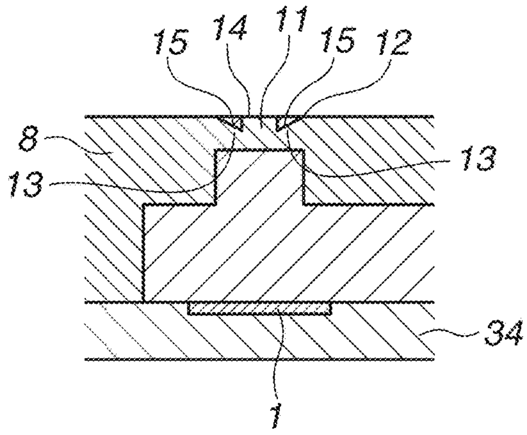
FIG. 3F is a diagram illustrating the discharge outlet of the first exemplary embodiment.

The discharge outlet 2 of the present exemplary embodiment will be described with reference to FIGS. 3A to 3F. FIG. 3A is a schematic diagram illustrating the neighborhood of the discharge outlet 2 when the discharge outlet 2 is viewed from a position facing the discharge outlet 2. FIG. 3B is a cross-sectional diagram at a section B-B' illustrated in FIG. 3A. FIG. 3C is a perspective view of the discharge outlet 2 illustrated in FIG. 3A. FIG. 3D is a diagram illustrating a state when the discharge outlet 2 is filled with the liquid. FIG. 3E and FIG. 3F are diagrams illustrating a modification of the discharge outlet 2 in the present exemplary embodiment, and corresponding to the cross-sectional diagram at the section B-B' illustrated in FIG. 3A.

As illustrated in FIG. 3A, an outer edge portion 12 of the discharge outlet 2 is circular, and a division member 9 dividing the discharge outlet 2 into a plurality of regions is formed in the discharge outlet 2 when viewed from the position facing the discharge outlet 2. In FIGS. 3A to 3F, the discharge outlet 2 is divided into four regions. The division member 9 is configured of a first portion 11 and a second portion 13. When a direction (a positive Z direction) in which the liquid is discharged from the discharge outlet 2 is a direction from a lower part to an upper part, an upper surface (hereinafter referred to as the first surface) 14 of the first portion 11 is almost the same in height as a surface 5 of the discharge outlet member 8. Being almost the same in height means that the surfaces are substantially the same in height. Therefore, even in a case where there is a difference in height, if the difference has occurred in a production process and the like, this case is applicable to being almost the same in height described here. The present disclosure is not limited to a configuration in which the first surface 14 is almost the same in height as the surface 5 of the discharge outlet member 8, and the first surface 14 can be formed at a position lower than the surface 5. Even in this case, an effect of the present disclosure to be described below can be obtained. However, if the first surface 14 is formed at a position lower than the surface 5 of the discharge outlet member 8, the discharge outlet 2 may not be filled with an amount of liquid sufficient for successful discharge. Therefore, it is desirable that the first surface 14 is almost the same in height as the surface 5 of the discharge outlet member 8.

In addition, an upper surface (hereinafter referred to as the second surface) 15 of the second portion 13 is at a height lower than the first surface 14 (in a negative Z direction). In the division member 9 illustrated in FIGS. 3A to 3F, the first portion 11 having a cross-shape with a large thickness is a portion formed near the center of the discharge outlet 2. The second portion 13 having a thickness smaller than that of the first portion 11 is a portion formed in contact with an inner wall of the discharge outlet 2. In FIGS. 3A to 3F, the second portion 13 is formed in a quantity of the number of divisions of the discharge outlet 2. In other words, four second portions 13 are formed.

When filling the discharge outlet 2, a liquid 22 does not adhere to (flow on to) the first surface 14 as illustrated in FIG. 3D. Meanwhile, the liquid 22 fills the region divided by the division member 9, and also adheres to (flows on to) the second surface 15. A water repellent treatment to be described in detail below is applied to the first surface 14, and thus the liquid 22 does not flow on to the first surface 14, which results in a filling state of the liquid 22 as illustrated in FIG. 3D.

Further, as illustrated in FIG. 3E and FIG. 3F, the second surface 15 may be formed with an inclination with respect to the surface 5 of the discharge outlet member 8. In such formation as well, an effect similar to the effect to be described below of the present exemplary embodiment can be obtained.

(Discharging State)

Figure 4A:
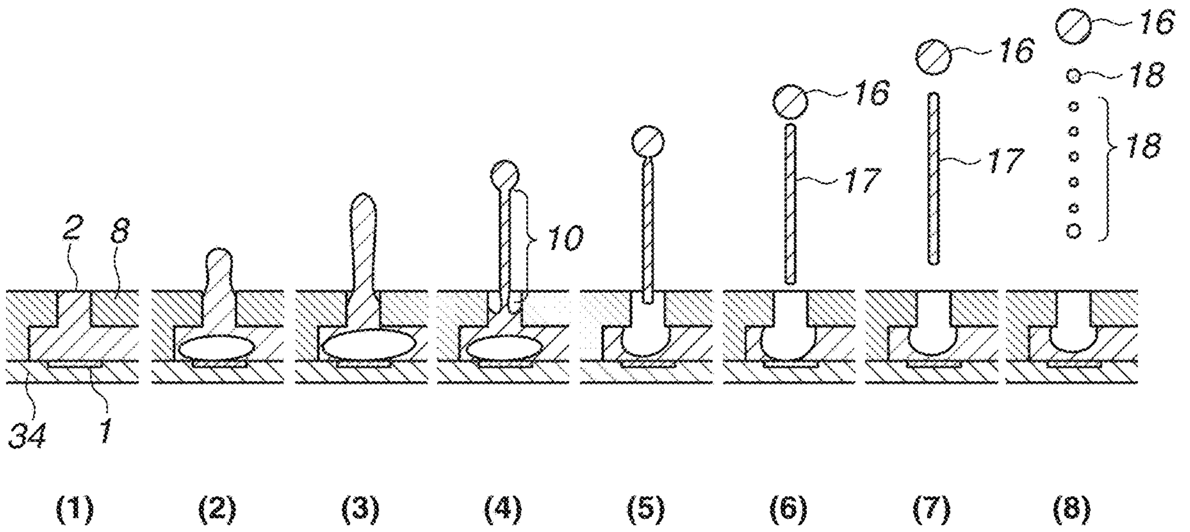
FIG. 4A is a diagram illustrating a state of discharge in the first exemplary embodiment.
Figure 4B:
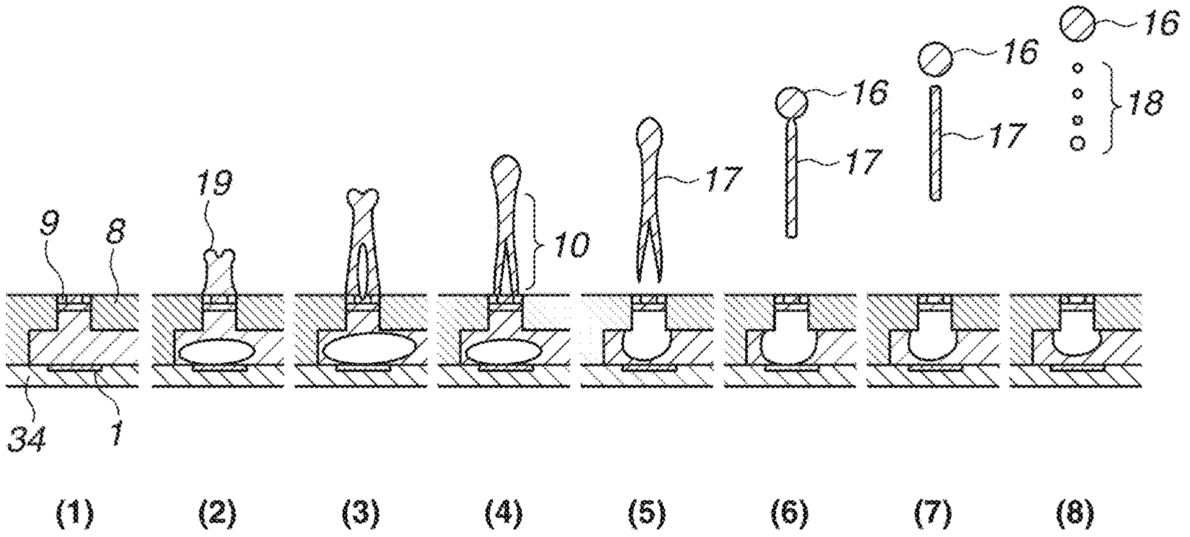
FIG. 4B is a diagram illustrating a state of discharge in the first exemplary embodiment.

A discharging state of the liquid from the discharge outlet 2 in the present exemplary embodiment will be described with reference to FIG. 4. FIG. 4A is a diagram illustrating a comparative example of the present exemplary embodiment, and illustrates a state where the liquid is discharged from the discharge outlet 2 in a case where the division member 9 is not disposed in the discharge outlet 2 illustrated in FIG. 3A. FIG. 4B is a diagram illustrating a state in which the liquid is discharged from the discharge outlet 2 according to the present exemplary embodiment illustrated in FIGS. 3A to 3F. First, the discharging state of the liquid in the comparative example will be described. Part (1) of FIG. 4A illustrates a state immediately before a discharge operation. An air bubble is generated in the liquid by driving an energy generation element 1, and the discharge operation starts (Part (2) of FIG. 4A). In Part (2) of FIG. 4A, the size of the air bubble generated in the liquid becomes maximum. Accompanying defoaming of the air bubble, the liquid near the discharge outlet 2 begins to be drawn toward the energy generation element, and consequently, a tailing portion 10 of the discharged droplet extends (Part (4) of FIG. 4A). Subsequently, the defoaming of the air bubble ends, and the tailing portion 10 of the discharged droplet completely separates from the liquid in the discharge outlet 2 (Part (5) of FIG. 4A). After that, the discharged droplet is split into a main drop 16 and a tail 17, and the tail 17 becomes a plurality of satellites 18 (Part (6) of FIG. 4A to Part (8) of FIG. 4A).

Next, the discharging state of the liquid according to the present exemplary embodiment will be described. Redundant descriptions of behavior similar to that of the comparative example in FIG. 4A will be omitted, and only a part different from the comparative example will be described. When discharging of the liquid from the discharge outlet 2 is started by generation of an air bubble, a tip 19 of a droplet has such a shape that has a slightly dented central part formed due to the division member 9 (Part (2) of FIG. 4B). Subsequently, a tailing portion 10 of the droplet is divided into a plurality of portions (Part (3) of FIG. 4B). Here, the number of portions into which the tailing portion 10 of the droplet is divided is equal to the number of regions into which the discharge outlet 2 is divided by the division member 9. In other words, in a case where the discharge outlet 2 illustrated in FIGS. 3A to 3F is used, the tailing portion 10 of the droplet is divided into four (in Part (3) of FIG. 4B). After that, the liquid separates from the discharge outlet 2 with the tailing portion 10 of the droplet divided into the plurality of portions, and a tail 17 is generated (Part (4) and (5) of FIG. 4B). In this way, in the present exemplary embodiment, the tailing portion 10 of the droplet that becomes the tail 17 later is divided into the plurality of portions. Consequently, each of the plurality of divided portions of the tailing portion 10 of the droplet is small in thickness, in comparison with the tailing portion 10 of the droplet in the comparative example illustrated in FIG. 4A. Subsequently, the tail 17 divided into the plurality of portions fly in a cluster (Part (6) and Part (7) of FIG. 4B). Then, satellites 18 are generated. Here, the amount of generated satellites depends on a length of the tail 17. Thus, as illustrated in Part (6) and Part (7) of FIG. 4B, because the full length of the tail 17 in the present exemplary embodiment is short, the amount of the satellites generated in the present exemplary embodiment is less than the amount of the satellites generated in the comparative example. Accordingly, it is apparent that generation of the satellites can be suppressed, according to the present disclosure. In a case where the division member 9 in FIGS. 3A to 3F is used, the tailing portion 10 of the droplet is divided into four, and thus the thickness of the tail 17 discharged from the discharge outlet 2 of the present exemplary embodiment is, when roughly estimated, about a quarter of the thickness of the tailing portion 10 in the comparative example.

(Division Member)

The amount of the generated satellites depends on the length of the tail 17. Further, the length of the tail 17 largely depends on the thickness (diameter) of the tailing portion 10 of the droplet. This is because, if the tailing portion 10 is thick, separation from the liquid in the discharge outlet 2 becomes late and thus the tail 17 can get longer, whereas if the tailing portion 10 is thin, separation from the liquid in the discharge outlet 2 occurs in an early stage and thus the tail 17 can be shorter. Thus, the present inventor considers that a reduction of the thickness of the tailing portion 10 is an important factor, and to this end, considers that it is necessary to divide the tailing portion 10 into a plurality of portions. Further, after studying, the present inventor has found that, in order to divide the tailing portion 10 into a plurality of portions, it is important to divide the inside of the discharge outlet 2 to form liquid divided regions in the discharge outlet 2, when viewed from a position facing the discharge outlet 2. This is because, if the liquid divided regions are formed not at a position viewed from the position facing the discharge outlet 2, the tailing portion 10 rejoins together in a discharge process because the liquids attract each other. Thus, in the present disclosure, the division member 9 is disposed in the discharge outlet 2, in order to form liquid divided regions.

Meanwhile, in a case where the liquid is completely divided, each of a plurality of droplets corresponding to the number of divisions is discharged independently. This plurality of droplets may land on the recording medium without attracting each other while flying, which results in a reduction in recording quality. For example, in a case where the liquid is divided into four, four independent droplets fly and each land on the recording medium, which results in a reduction in recording quality. Thus, in order to suppress generation of the satellites without reducing recording quality, it is necessary to keep the tip 19 of the discharged droplet in a single tip, while dividing the tail 17 into a plurality of portions. In the present exemplary embodiment, the second surface 15 is disposed at the division member 9. Disposing the second surface 15 allows the liquid to flow on to the second surface, and a region for holding the liquids together beforehand before a discharge operation can be formed. In a case where discharge from the discharge outlet 2 is performed in this state, it is possible to divide the tailing portion 10 with the tip 19 of the discharged droplet kept in a single tip.

Figure 5:
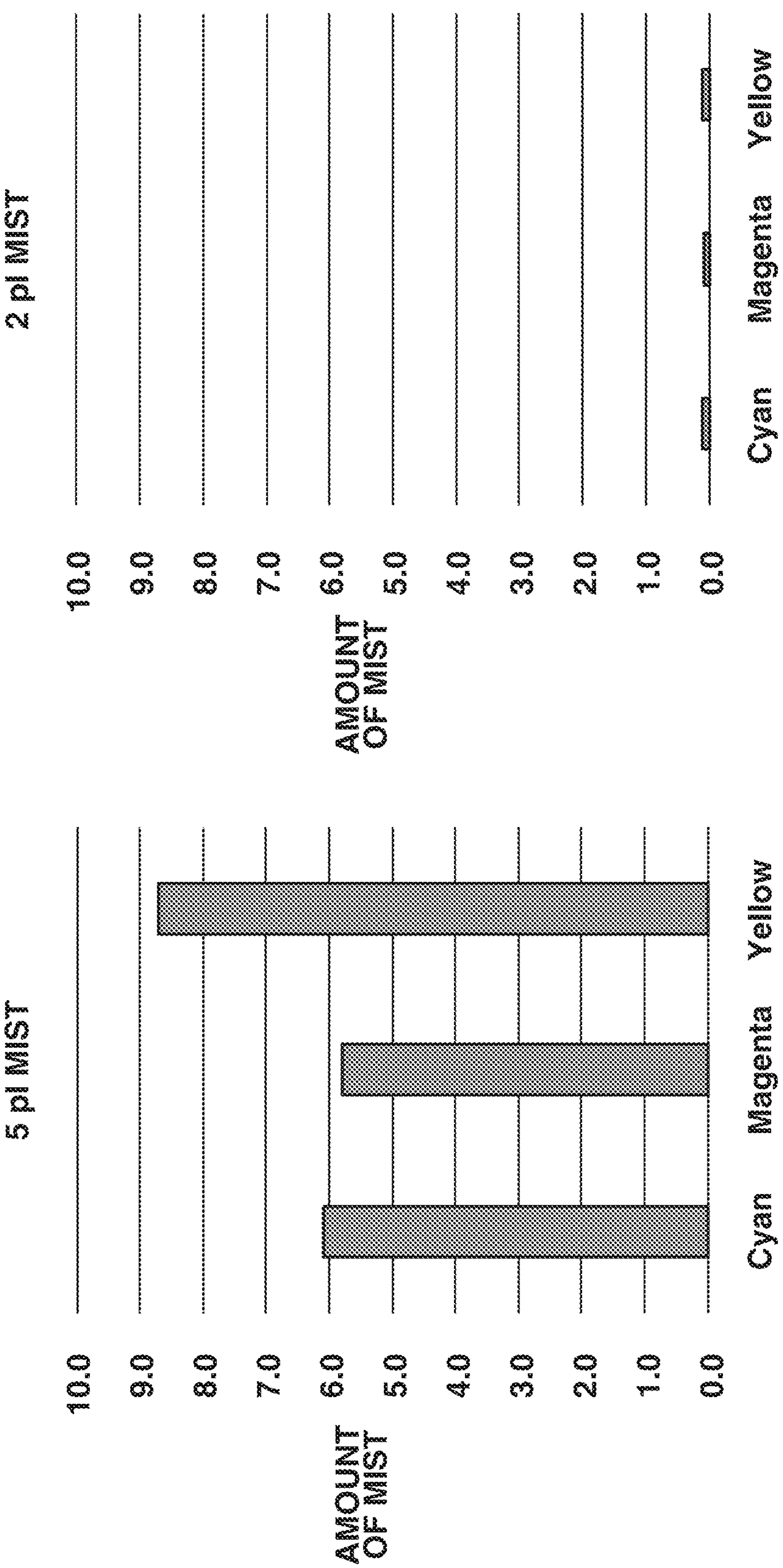
FIG. 5 is a diagram illustrating results of measuring an amount of mist.

In addition, according to the present disclosure, it is possible to suppress generation of infinitesimal droplets (hereinafter referred to as mist) that lose speed and float in air before arriving at the recording medium. FIG. 5 illustrates results of measuring of an amount of mist generated when a discharge outlet in which the amount of the liquid discharged from the discharge outlet is 5 pl is used, and an amount of mist generated when a discharge outlet in which the amount of the liquid discharged from the discharge outlet is 2 pl is used. Amounts of mist of cyan (Cyan), magenta (Magenta), and yellow (Yellow) are illustrated. As illustrated in FIG. 5, the amount of mist generated from the discharge outlet of the discharge amount of 2 pl is about one-fiftieth of the amount of mist generated from the discharge outlet of the discharge amount of 5 pl. In this way, the amount of mist of the discharge outlet for the small discharge amount is small compared with that of the discharge outlet for the large discharge amount. In the present disclosure, the discharge outlet 2 is divided into the plurality of regions by the division member 9 when viewed from the position facing the discharge outlet 2. In addition, because the liquid discharged from the discharge outlet 2 can be considered as being discharged from the divided region, each of the divided regions can be considered as being a discharge outlet for the small discharge amount. In other words, the discharge outlet 2 of the present disclosure can be considered as an assembly of discharge outlets for the small discharge amount. Therefore, according to the present disclosure, generation of mist can also be suppressed.

In the present exemplary embodiment, the water repellent treatment is applied to the first surface 14, and the contact angle between the first surface 14 and the liquid (the liquid in the discharge outlet 2 to be discharged) is 80 degrees or more and 100 degrees or less. Here, the contact angle is a contact angle of the droplet of the liquid on the member surface (dynamic receding contact angle). The water repellency means that there is no wet-spreading of a drop of water on a member when the drop of water is in contact with the member, and it is possible to determine whether the water repellency of the member is high or low by measuring the contact angle of the droplet of the liquid on the member surface (dynamic receding contact angle). It is possible to suppress flowing of the liquid on to the first surface 14 by applying the water repellent treatment to the first surface 14. However, in the present disclosure, the water repellent treatment may not be applied to the first surface 14, and, even in that case, the above-described effect can be obtained. In other words, even in a case where the discharge operation is performed in a state where the liquid is present on the first surface 14, the tailing portion 10 of the droplet can be divided into the plurality of portions by the division member 9. However, there can be also a case where, depending on the amount (thickness) of the liquid present on the first surface 14, the tailing portion 10 of the droplet is not divided into the plurality of portions, and thus it is desirable to prevent the above-described liquid from being present on the first surface 14, as illustrated in FIG. 3D. Here, examples of the method of preventing the liquid from being present on the first surface 14 include application of the water repellent treatment to the first surface 14 as described above.

Further, in the present disclosure, a position of the liquid surface (a position of a surface where a liquid forms a meniscus, and hereinafter referred to as the liquid surface position) in the discharge outlet 2 can be lower than the second surface 15. In other words, the liquid is not necessarily present on the second surface. Even in this case, the liquid to which energy is applied by the energy generation element 1 passes through the division member 9, and thus the tailing portion 10 of the droplet discharged from the discharge outlet 2 is divided into the plurality of portions, and the effect of the present disclosure can be obtained. However, depending on the thickness or the like of the division member 9, the tip 19 of the discharged liquid may land on the recording medium while remaining divided as the plurality of portions without rejoining together. In order to avoid such a state, it is desirable that the liquid surface position is at a position higher than the second surface 15 and lower than the first surface 14, in the discharge state, as illustrated in FIG. 3D.

It is desirable that the division member 9 is formed in the discharge outlet 2 such that, where the length of the discharge outlet 2 in the Z direction is 1, the second surface 15 is disposed at a position of at least 0.5 from the surface 5 of the discharge outlet member 8. This is because, if the second surface 15 is formed lower than this position, a large amount of liquid is present on the second surface when the liquid is discharged, and the effect on dividing the tailing portion 10 of the droplet becomes small. Thus, to increase the effect on dividing the tailing portion 10 of the droplet, it is more desirable to form the division member 9 such that, where the length of the discharge outlet 2 in the Z direction is 1, the second surface 15 is at a position of up to 0.3 from the surface 5 of the discharge outlet member 8.

In addition, desirably, there is a part where the first portion 11 and the second portion 13 overlap each other in the Z direction when the division member 9 is viewed from the section illustrated in FIG. 3B. This is because the tailing portion 10 of the droplet is more reliably divided by the division member 9 by the presence of the part where the first portion 11 and the second portion 13 overlap each other in the Z direction. Further, it is desirable that an undersurface 23 of the first portion 11 and an undersurface 24 of the second portion 13 are the same in height in the Z direction, when the division member 9 is viewed from the section illustrated in FIG. 3B. This is because, in a case where the undersurface 23 and the undersurface 24 are different in height, in particular, a large amount of liquid is present on the second surface 15, and the effect on dividing the tailing portion 10 of the droplet becomes small, as described above.

Figure 6A:
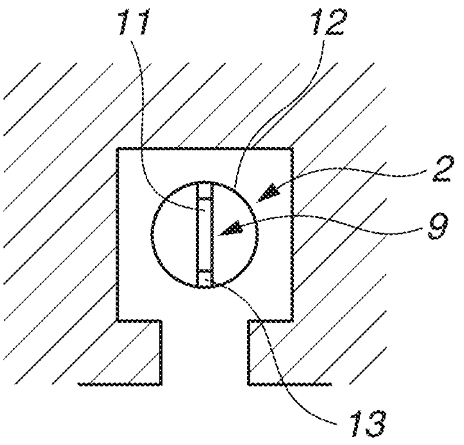
FIG. 6A is a diagram illustrating a discharge outlet of a second exemplary embodiment.
Figure 6B:
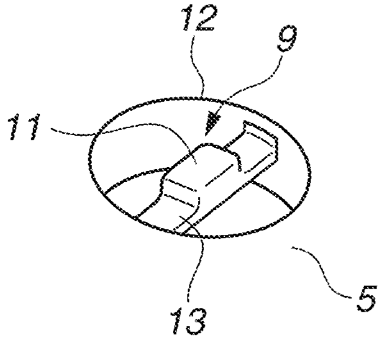
FIG. 6B is a diagram illustrating the discharge outlet of the second exemplary embodiment.
Figure 6C:
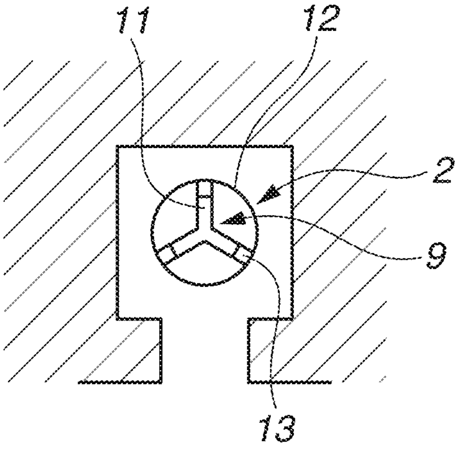
FIG. 6C is a diagram illustrating a discharge outlet of the second exemplary embodiment.
Figure 6D:
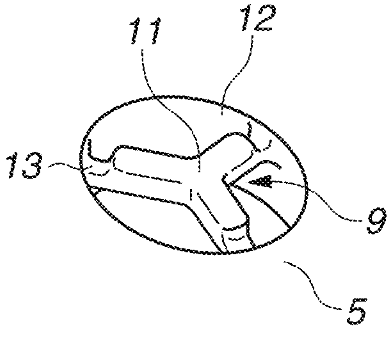
FIG. 6D is a diagram illustrating the discharge outlet of the second exemplary embodiment.
Figure 6E:
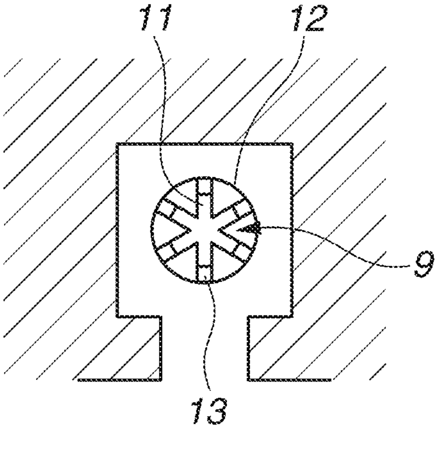
FIG. 6E is a diagram illustrating a discharge outlet of the second exemplary embodiment.
Figure 6F:
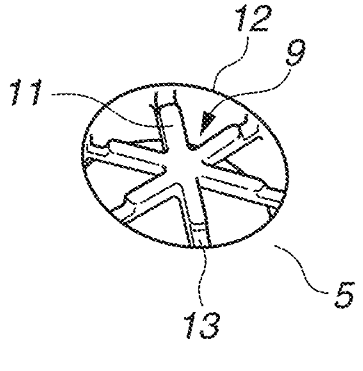
FIG. 6F is a diagram illustrating the discharge outlet of the second exemplary embodiment.

A second exemplary embodiment will be described with reference to FIGS. 6A to 6F. Portions similar to those of the first exemplary embodiment will be assigned the same reference numerals as those of the first exemplary embodiment, and the redundant description will be omitted. In the present exemplary embodiment, the number of divisions of the region in the discharge outlet 2 by the division member 9 is changed, in comparison with the first exemplary embodiment. FIG. 6A is a top view of the discharge outlet 2 of a case where the region in the discharge outlet 2 is divided into two. FIG. 6B is a perspective view of the discharge outlet 2 illustrated in FIG. 6A. Similarly, FIG. 6C and FIG. 6D are a top view and a perspective view of a case where the region in the discharge outlet 2 is divided into three, and FIG. 6E and FIG. 6F are a top view and a perspective view of a case where the region in the discharge outlet 2 is divided into six.

As described above, the number of portions into which the tail is divided corresponds to the number of divisions of the inside of the discharge outlet 2. Thus, if the number of divisions of the inside of the discharge outlet 2 is increased, the number of divisions of the tail increases accordingly. Then, the thickness of each tail is further reduced, the droplet separates from the liquid in the discharge outlet 2 at earlier timing, and the satellites and mist can be further reduced. Accordingly, among the discharge outlets 2 illustrated in FIGS. 6A to 6F, the effect of suppressing generation of satellites and mist from the discharge outlet 2 in FIG. 6E and FIG. 6F is large. However, if a width of the division member 9 is reduced by an increase in the number of divisions, the tailing portion 10 of the liquid can be output as one without being divided.

The region in the discharge outlet 2 is divided into regions equal in area, but the present disclosure is not limited thereto, i.e., the region in the discharge outlet 2 is not necessarily equally divided. However, in a case where the region in the discharge outlet 2 is not equally divided, a shape of the liquid to be discharged may become asymmetry, which causes a deterioration in recording quality. Thus, it is desirable that the discharge outlet 2 is equally divided such that areas of the respective divided regions are equal. The areas being equal means that the areas are substantially equal, and the areas are regarded as being equal even if the areas are slightly different because of a production error or the like.

Other Exemplary Embodiments

Figure 7A:
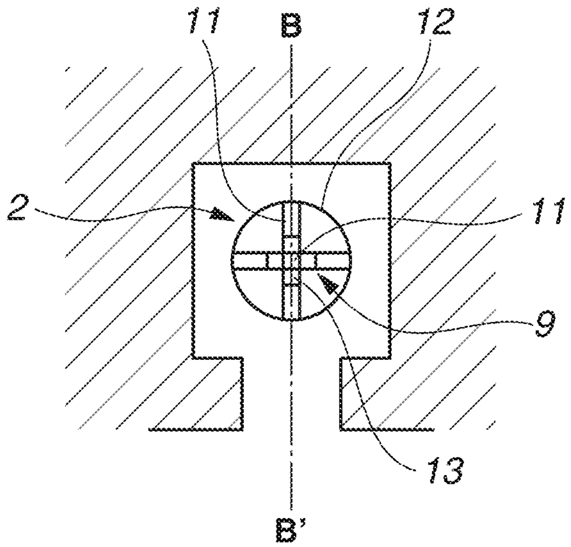
FIG. 7A is a diagram illustrating a discharge outlet of another exemplary embodiment.
Figure 7B:
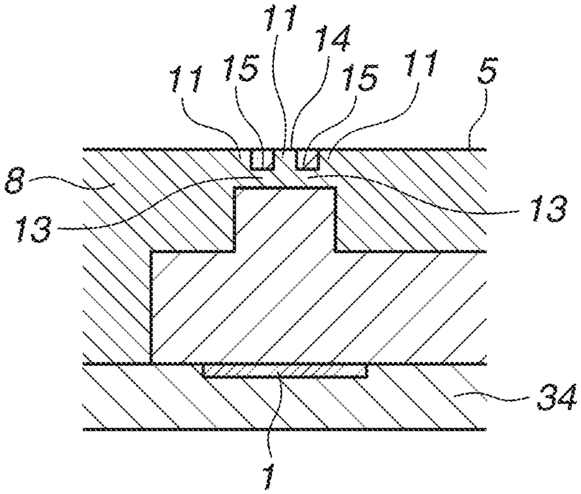
FIG. 7B is a diagram illustrating the discharge outlet of another exemplary embodiment.
Figure 7C:
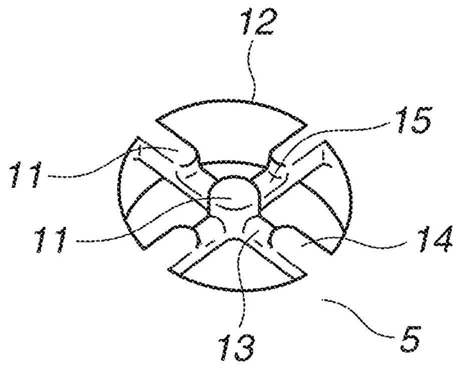
FIG. 7C is a diagram illustrating the discharge outlet of another exemplary embodiment.

Other exemplary embodiments will be described with reference to FIGS. 7A to 7C, FIGS. 8A to 8C, and FIGS. 9A to 9C. Portions similar to those of the first exemplary embodiment will be assigned the same reference numerals as those of the first exemplary embodiment, and the redundant description will be omitted. FIGS. 7A to 7C illustrate diagrams in which the second surface 15 is disposed at a position near the center of the discharge outlet 2. The second surface 15 is disposed to rejoin the liquids. Thus, as long as the liquids are rejoined, the second surface 15 can be formed near the center of the discharge outlet 2 as illustrated in FIGS. 7A to 7C. Further, the second surface 15 can be optimized to stably obtain a desired effect by being changed, with respect to various factors affecting the discharge, such as dimensions of the discharge outlet 2 and a physical property of the liquid.

Figure 8A:
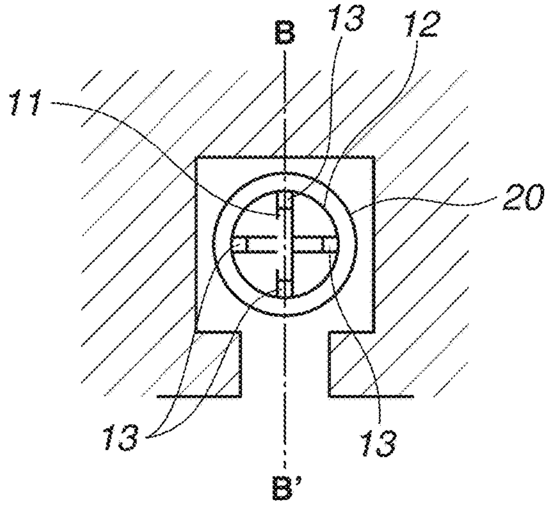
FIG. 8A is a diagram illustrating a discharge outlet of another exemplary embodiment.
Figure 8B:
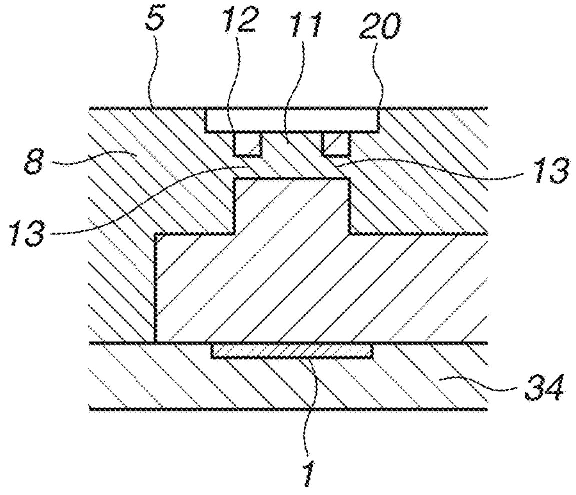
FIG. 8B is a diagram illustrating the discharge outlet of another exemplary embodiment.
Figure 8C:
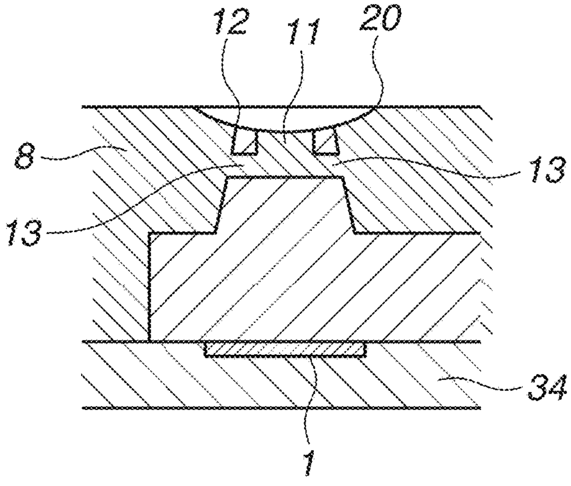
FIG. 8C is a diagram illustrating the discharge outlet of another exemplary embodiment.

FIG. 8A is a diagram illustrating a form in which a concave portion 20 is provided near the surface 5 of the discharge outlet member 8, and the discharge outlet 2 is disposed therein. FIG. 8B is a cross-sectional diagram at a section B-B' illustrated in FIG. 8A. With the concave portion 20 in the surface 5 of the discharge outlet member 8, it become possible to, for example, dispose a slope on the outer edge of the discharge outlet 2, or reduce a resistance in the liquid discharge direction while maintaining the strength of the discharge outlet member 8. Further, FIG. 8C is a modification of FIG. 8B. In the present exemplary embodiment, a section of the concave portion may be either a rectangular form as illustrated in FIG. 8B or a form shaped like a bowl as illustrated in FIG. 8C.

Figure 9A:
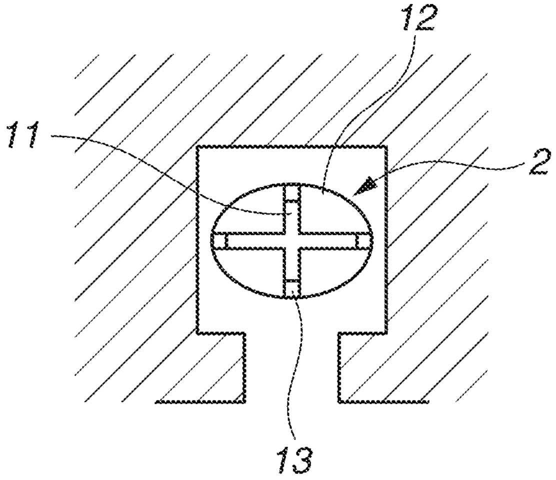
FIG. 9A is a diagram illustrating a discharge outlet of another exemplary embodiment.
Figure 9B:
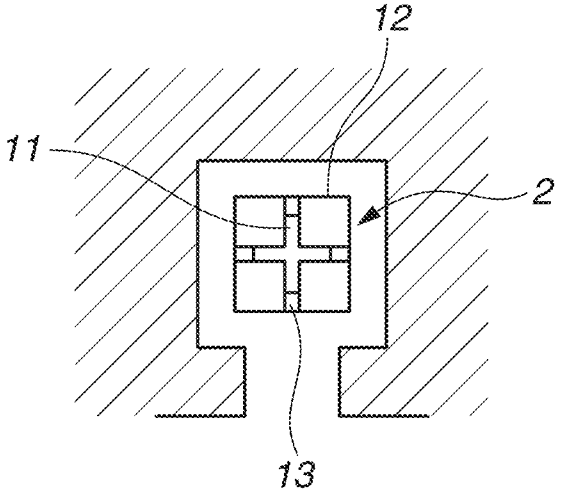
FIG. 9B is a diagram illustrating a discharge outlet of another exemplary embodiment.
Figure 9C:
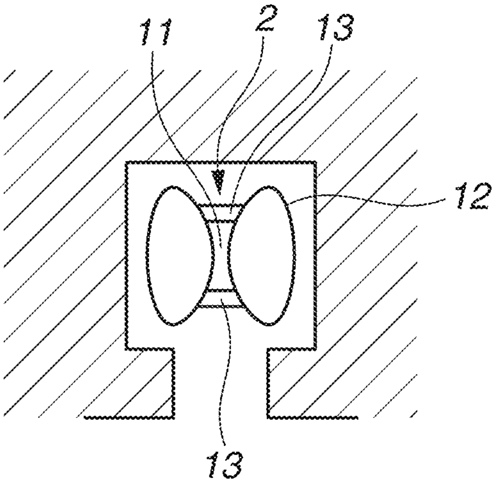
FIG. 9C is a diagram illustrating a discharge outlet of another exemplary embodiment.

Further, the shape of the outer edge portion 12 of the discharge outlet 2 may be oval or square as illustrated in FIG. 9A and FIG. 9B. Alternatively, a shape illustrated in FIG. 9C may be adopted. If the division member dividing the inside of the discharge outlet 2 has the first surface 14 and the second surface 15, the effect of the present disclosure can be obtained.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A liquid discharge head comprising:
a discharge outlet configured to discharge a liquid,
wherein a division member dividing the discharge outlet into a plurality of regions is formed in the discharge outlet when viewed from a position facing the discharge outlet,
wherein, when a direction in which the liquid is discharged from the discharge outlet is a direction upward from bottom, the division member has a first surface and a second surface facing upward,
wherein the second surface is disposed at the bottom lower than the first surface, and
wherein a contact angle between the first surface and the liquid is 80 degrees or more and 100 degrees or less.

2. The liquid discharge head according to claim 1, wherein a position of a liquid surface of the liquid inside of the discharge outlet is lower than the first surface and higher than the second surface.

3. The liquid discharge head according to claim 1,
wherein the discharge outlet is formed in a discharge outlet member, and
wherein the second surface is disposed at a position lower than a surface of the discharge outlet member.

4. The liquid discharge head according to claim 1, wherein the division member has the same number of second surfaces as the number of regions.

5. The liquid discharge head according to claim 1, wherein the discharge outlet is divided into two by the division member.

6. The liquid discharge head according to claim 1, wherein the discharge outlet is divided into three by the division member.

7. The liquid discharge head according to claim 1, wherein the discharge outlet is divided into four by the division member.

8. The liquid discharge head according to claim 1, wherein the discharge outlet is divided into six by the division member.

9. The liquid discharge head according to claim 1, wherein the second surface is in contact with an inner wall of the discharge outlet.

10. The liquid discharge head according to claim 1,
wherein the division member includes a first portion and a second portion,
wherein the first surface is a surface facing upward in the first portion, and the second surface is a surface facing upward in the second portion, and
wherein a thickness of the first portion in the direction in which the liquid is discharged from the discharge outlet is larger than a thickness of the second portion in the direction.

11. A discharge method comprising:
ejecting a liquid from a discharge outlet, using a liquid discharge head including the discharge outlet configured to discharge the liquid and an energy generation element configured to generate energy for discharging the liquid from the discharge outlet,
wherein a division member dividing the discharge outlet into a plurality of regions is formed in the discharge outlet when viewed from a position facing the discharge outlet,
wherein, when a direction in which the liquid is discharged from the discharge outlet is a direction upward from bottom, the division member has a first surface and a second surface facing upward,
wherein the second surface is disposed at the bottom lower than the first surface,
wherein the liquid is discharged from the discharge outlet by driving the energy generation element, in a state where the liquid is present at a position lower than the first surface and higher than the second surface,
wherein the discharge outlet is divided into three or more regions by the division member, and
wherein a tailing portion of the liquid discharged from the discharge outlet is divided into a number equal to the number of the plurality of regions.

12. The discharge method according to claim 11, wherein a position of a liquid surface of the liquid inside of the discharge outlet is lower than the first surface and higher than the second surface.

13. The discharge method according to claim 11,
wherein the discharge outlet is formed in a discharge outlet member, and
wherein the second surface is disposed at a position lower than a surface of the discharge outlet member.

14. The discharge method according to claim 11, wherein the division member has the same number of second surfaces as the number of regions.

15. The discharge method according to claim 11, wherein the discharge outlet is divided into two by the division member.

16. The discharge method according to claim 11, wherein the discharge outlet is divided into three by the division member.

17. The discharge method according to claim 11, wherein the discharge outlet is divided into four by the division member.

18. The discharge method according to claim 11, wherein the discharge outlet is divided into six by the division member.

19. The discharge method according to claim 11, wherein the second surface is in contact with an inner wall of the discharge outlet.

20. The discharge method according to claim 11,
wherein the division member includes a first portion and a second portion, wherein the first surface is a surface facing upward in the first portion, and the second surface is a surface facing upward in the second portion, and wherein a thickness of the first portion in the direction in which the liquid is discharged from the discharge outlet is larger than a thickness of the second portion in the direction.

* * * * *